United States Patent [19]

de Niet

[11] 4,280,158
[45] Jul. 21, 1981

[54] MAGNETORESISTIVE READING HEAD

[75] Inventor: Edmond de Niet, Eindhoven, Netherlands

[73] Assignee: U.S. Philips Corporation, New York, N.Y.

[21] Appl. No.: 45,908

[22] Filed: Jun. 6, 1979

[30] Foreign Application Priority Data

Jun. 19, 1978 [NL] Netherlands .................. 7806568

[51] Int. Cl.³ .................... G11B 5/02; G11B 5/12; G11B 5/30
[52] U.S. Cl. .................................. 360/113; 360/66; 360/123
[58] Field of Search ................ 360/112–113, 360/123–124, 66; 338/32 R; 324/46, 252

[56] References Cited

U.S. PATENT DOCUMENTS

| 3,493,694 | 2/1970 | Hunt | 360/113 |
| 3,585,314 | 6/1971 | Korn | 360/124 |
| 4,050,086 | 9/1977 | Harr | 360/113 |
| 4,122,505 | 10/1978 | Kuijk | 360/113 |

FOREIGN PATENT DOCUMENTS 2012095 7/1979 United Kingdom ............ 360/113

OTHER PUBLICATIONS

IBM Tech. Disc. Bull., Nepela et al., Resistive Element for Bias and Noise Cancellation of MR Head, vol. 17, No. 9, Feb. 1975, pp. 2759–2760.

Primary Examiner—Alfred H. Eddleman
Attorney, Agent, or Firm—Robert S. Smith

[57] ABSTRACT

A magnetic reading head having a magnetoresistive element which is connected to a reading amplifier. In order to reduce the modulation noise (Barkhausen effect) when making the relationship between the resistance variation and the strength of the signal field linear in a negative feedback loop of the reading amplifier an electric turn is present which turn is positioned relative to the magnetoresistive element in such manner that a negative feedback field ($H_t$) can be generated with it which causes a magnetic flux in the element which is directed oppositely to the magnetic flux caused in the element by a magnetic field ($H_y$) to be detected.

6 Claims, 12 Drawing Figures

MAGNETORESISTIVE READING HEAD

The invention relates to a magnetic reading head for detecting information-representing magnetic fields.

A magnetic reading head is known from the article "The Barberpole, a linear magnetoresistive head" in IEEE Transactions on Magnetics, September 1975, Vol. Mag. 11 No. 5, pp. 1215–1217. This known reading head comprises a substantially flat magnetoresistive element which is provided on a substrate and consists of metallic ferromagnetic material having an easy axis of magnetization in the plane of the element, said element being provided on two oppositely located ends with contacts for the connection to a source providing a measuring current, and to a reading amplifier.

The operation of the known magnetoresistive reading head is based on the use of a strip-shaped element of a ferromagnetic metallic material having low anisotropy, for example Ni-Fe, which is provided with one of its edges in the immediate proximity of or in contact with a magnetic recording medium. The field of the recording medium produces changes in the magnetization of the element and modulates the resistance thereof via the so-called magnetoresistance effect. This means that, when the recording medium passes the head, the information-representing magnetic fields present on the recording medium rotate the spin system of the magnetoresistive element so that the electric resistance varies. The output signal of a detection circuit which is connected to the element then is a function of the information stored in the recording medium.

Since the variation of the electric resistance of a magnetoresistive element under the influence of an external magnetic field is quadratic, it is usual in the reproduction of analogue signals to improve the operation of the head by linearization of the characteristic resistance-magnetic field. For this purpose, the element should be given such a bias that the direction of magnetization with a signal field zero encloses an angle of approximately 45° with the direction of current passage through the element.

In the magnetoresistive reading head described in the said article this is realized in that the easy axis of magnetization is parallel to the longitudinal axis of the element and in that means in the form of equipotential strips of readily conductive material are present which force the current to flow through the element at an angle $\alpha$ of approximately 45° with the longitudinal axis (so-called electric bias). The known reading head furthermore comprises means to generate a magnetic auxiliary field the direction of which is parallel to the easy axis of magnetization of the element. This axially directed field ensures that one of the two mutually opposite directions in which the magnetization vector may be, is predetermined, so that flipping over from one direction to the other, which would result in a phase rotation of 180° of the output signal of the element, is prevented.

Another known method of obtaining a linear response is based on the application of a magnetic auxiliary field parallel to the plane of the element and perpendicular to the easy axis of magnetization. By making the strength thereof approximately equal to the strength of the so-called anisotropic demagnetising field it is achieved that the direction of magnetization with a signal field zero encloses an angle of approximately 45° with the direction of current passage through the element (so-called magnetic bias).

Although both known methods of biasing make the relation between the resistance variation and the strength of the signal field linear to a first approximation, a drawback experienced in the practical application is that the noise level is high. This modulation noise (Barkhausen effect) is the result of the occurrence of more than one magnetic domain in the magnetoresistive element.

It is the object of the invention to provide a reading head which enables playback with a good signal-to-noise ratio.

According to the present invention there is provided a magnetic reading head for detecting information-representing magnetic fields, comprising on a substrate a substantially flat magnetoresistive element of metallic ferromagnetic material having an easy axis of magnetization in the plane of the element, said element being provided on two oppositely located ends with contacts for the connection to a source providing a measuring current and to a reading amplifier, and an electric turn which is provided in a negative feedback loop of the reading amplifier, the electric turn being arranged relative to the magneto-resistive element in such manner that, when a current passes through it, it generates a negative feedback field which causes a magnetic flux in the element which is directed oppositely to the magnetic flux caused in the element by a magnetic field to be detected.

By using negative feedback in this manner which influences the incoming signal flux it is achieved that the driving of the magnetoresistive element is reduced, which is associated with a reduction of the level of the Barkhausen effect which is coupled with the driving of the element. In a practical case it was found that as a result of negative feedback the Barkhausen effect was reduced by 10 to 20 dB. As regards the resistance noise resulting from temperature, fluctuations, the signal-to-noise ratio can be improved in that it is possible when using feedback to use an optimum sensitive magnetoresistive element. Until now the magnetoresistive elements have been made more insensitive to reduce the possibility of distortion. When feedback is used, on the contrary a magneto-resistive element which is as sensitive as possible can be used.

A sensitive element provides a better signal-to-noise ratio, the function of the negative feedback being that a smaller part of the magneto-resistance characteristic is used, which in itself already reduces the distortion. In addition, the distortion which would be present with the same driving without negative feedback, is still reduced by the negative feedback factor.

An additional advantage of the use of feedback coupling in both electrically and magnetically biased magnetoresistive elements is the constancy of the amplification; in negative feedback this is not so much determined by the sensitivity of the magneto-resistive element or of the amplifier but rather by the ratio R/P, where R is the negative feedback resistance and P is a factor which determines the coupling between the negative feedback turn and the magnetoresistive element. This coupling depends mainly on the distance between the turn and the element, and this is fixed. (The distance corresponds to the thickness of the insulation layer provided between the magnetoresistive element and the negative feedback turn. This thickness generally is approximately 0.3 $\mu$m).

The use of feedback coupling in magnetically biased magnetoresistive elements of the type in which an electric turn is used to generate the required magnetic bias field is already particularly simple since this turn may now also be used to pass the negative feedback current through it. (Other types of magnetically biased magneto-resistive elements, for example, use a permanent magnetic layer to generate the bias field.

The invention will be described in greater detail, by way of example, with reference to the accompanying drawings, wherein FIG. 1 shows diagrammatically a reading head with electric bias in which the negative feedback field is generated by an alternating current;

Figure 12:
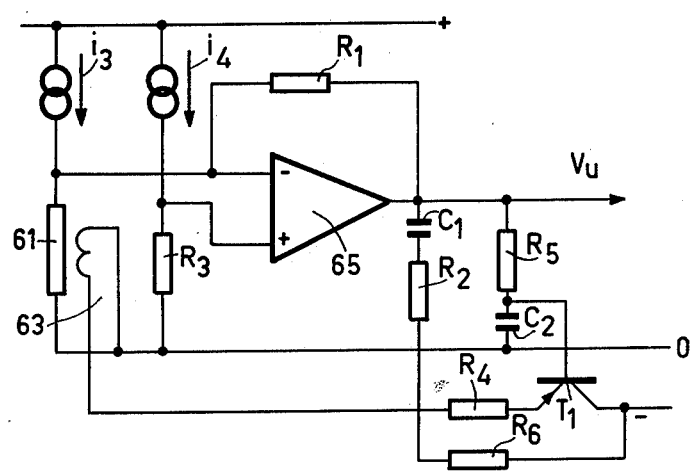
Figure 10:
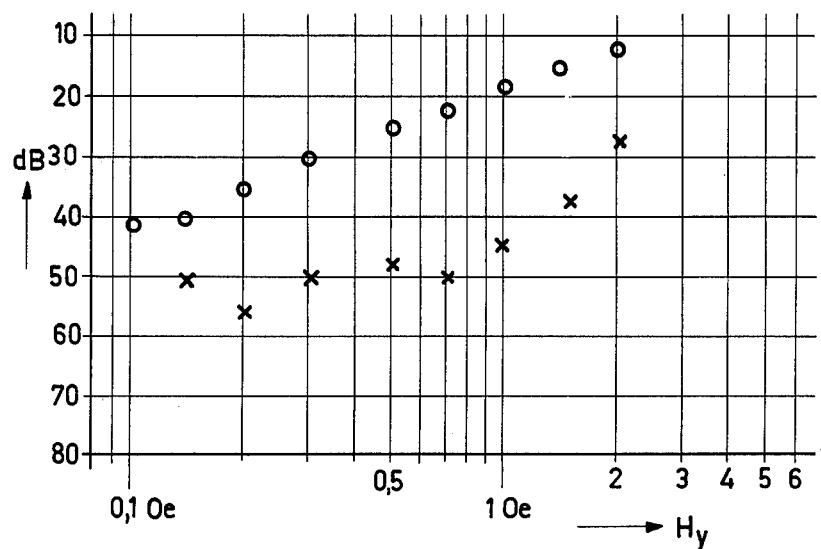
Figure 11:
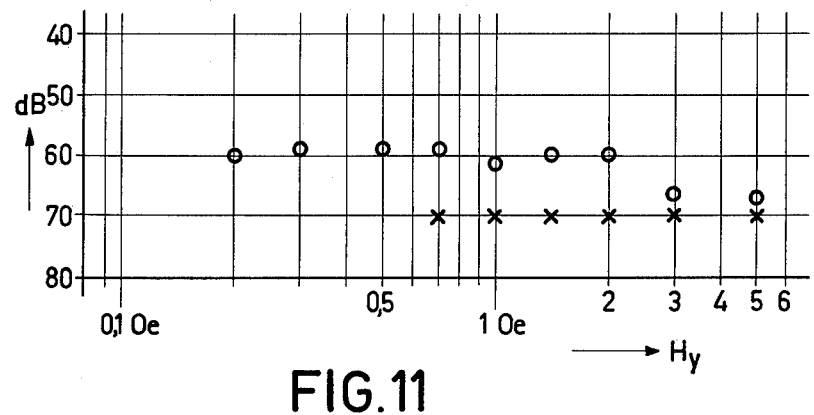

FIGS. 10 and 11 are graphs showing the distortion in dB of a magnetoresistive element at different strengths of a transversal external magnetic field $H_y$ in the case in which no negative feedback field is used and the case in which such a field is used, respectively; and FIG. 12 shows diagrammatically a magnetically biased reading head in which a negative feedback field is generated by an alternating current and a magnetically biased field is generated by a direct current.

Figure 1:
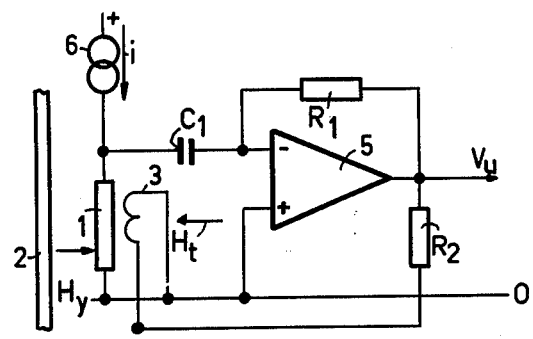

FIG. 1 shows diagrammatically a magnetoresistive element 1 with electric bias which is in flux coupling with a recording medium 2 the magnetic field $H_y$ of which influences the resistance of the element 1. The element 1 is combined with an electric turn 3 which may also be in the form of a straight wire or of a single current loop. By means of the turn 3, a magnetic field $H_t$ can be generated, if a current is passed through it, which field is opposite to the magnetic field $H_y$. In this case the turn 3 is connected in series with a resistor $R_2$. In itself this resistor $R_2$ is not essential. However in this case, the resistor $R_2$ serves to adapt an amplifier 5 which in fact is a voltage source to a current source, the current from which source is conveyed to the turn 3 (if the amplifier 5 were an ideal current source, the resistor $R_2$ would not be necessary. However, most amplifiers behave more or less as a voltage source). The series arrangement of the turn 3 and the resistor $R_2$ is situated in a feedback loop of the amplifier 5 which in this case is an operational amplifier (type TDA 1034), the resistor $R_2$ being connected at the output of the amplifier 5 with output voltage $V_u$. The element 1 through which a measuring current i is passed by means of a current source 6 is connected to the input of the amplifier 5 via a capacitor $C_1$.

In a practical case:
$R_1 = 22$ k$\Omega$
$R_2 = 100$ $\Omega$
$C_1 = 470$ $\mu$F
$i = 30$ mA
$R_{element\ 1} = 100$ $\Omega$
amplification of amplifier 5 is $220 \times (= R_1/R_{element\ 1})$ negative feedback via the negative feedback wire is $35 \times$.

Figure 2:
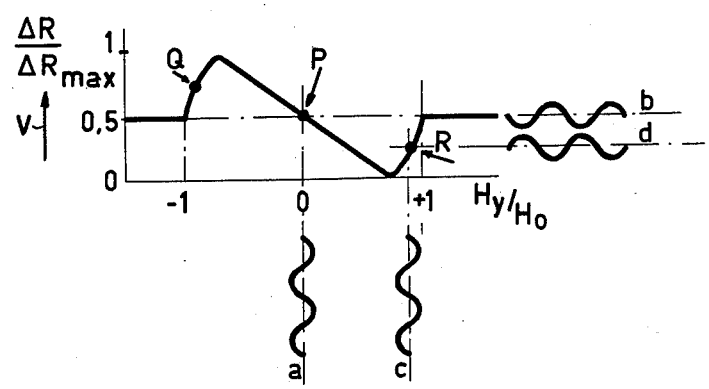
FIG. 2 is a graph showing the variation of the resistance R of a non-magnetically biased magnetoresistive element as a function of an external magnetic field $H_y$, in which $\Delta R/\Delta R_{max}$ is plotted on the vertical axis and $H_y/H_o$ is plotted on the horizontal axis.

FIG. 2 is a graphic representation of the change of the resistance R of the magnetoresistive element 1 shown in FIG. 1 under the influence of an external field $H_y$, in which $\Delta R/\Delta R_{max}$ is plotted on the vertical axis and the standardized field $H_y/H_o$ is plotted on the horizontal axis. $H_o$ is the anisotropic demagnetising field for which it holds that $H_o = t/w \times M_s$ (t = thickness of the element, w = width of the element and $M_s$ is the saturation magnetisation). Full driving occurs at $H_y = H_o$. In a practical case, $H_o$ was equal to 20 Oersted.

In the normal adjusting point P a voltage denoted by b should be across the element 1 with a varying $H_y$ field denoted by a is said element is connected as shown in FIG. 1. The adjusting point may become located in Q or R by an external (interference) field. For example, a voltage denoted by d is associated with an external field $H_y$ denoted by c. The voltages denoted by b and d, respectively, are in opposite phases. For negative feedback it is necessary for the signal field $H_y$ from the recording medium 2 to be decreased by the field $H_t$ which the reading amplifier 5 generates in the negative feedback turn 3. There are several possible choices to obtain the correct phase:

1. change the direction of the current i through the element 1;
2. invert the phase of the amplifier 5 (from inverter—as shown—to non-inverter);
3. interchange the connection wires to the negative feedback turn 3;
4. arrange the negative feedback turn 3 on the other side of the element 1.

Figure 3:
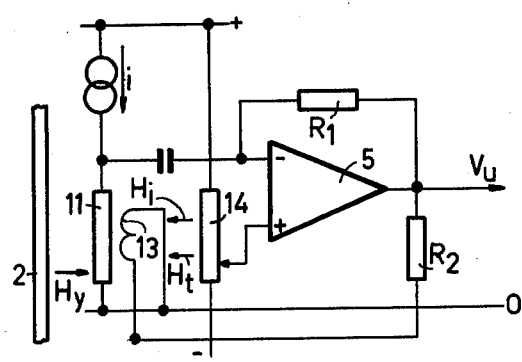
FIGS. 3 and 4 show diagrammatically a first and a second modified embodiment of a magnetically biased reading head in which the negative feedback field is generated by an alternating current.
Figure 4:
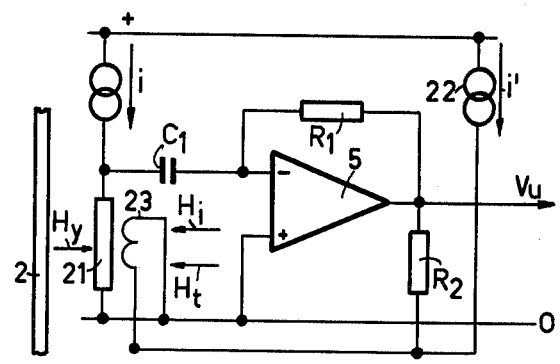

FIGS. 3 and 4 show magnetoresistive elements 11 and 21, respectively, which are connected to circuits which are related to that of FIG. 1. Therefore the resistors $R_1$ and $R_2$, the capacitor $C_1$ and the amplifier 5 are always the same. In FIG. 3, however, the magnetoresistive element 11 is of the magnetically biased type. The required magnetic bias field $H_i$ is generated by means of an electric winding 13 which also provides the negative feedback field $H_t$ and in which the direct current for generating the bias field is supplied by the amplifier 5 itself, for which purpose the positive input of the amplifier can be connected to a desired voltage via a potentiometer 14. In a negative feedback loop of the amplifier 5 the winding 13 is incorporated in series with a resistor $R_2$. FIG. 4 shows an alternative manner of obtaining the current for the bias field. In this case a magnetoresistive element 21 which is also of the magnetically biased type is connected to one input of the amplifier 5 having a negative feedback loop coprising an electric turn 23 in series with a resistor $R_2$ connected to the other input. A bias current i' for the bias field is applied separately to the turn 23 via a current source 22. In both cases the value of the bias current is approximately 1 mA.

Figure 5:
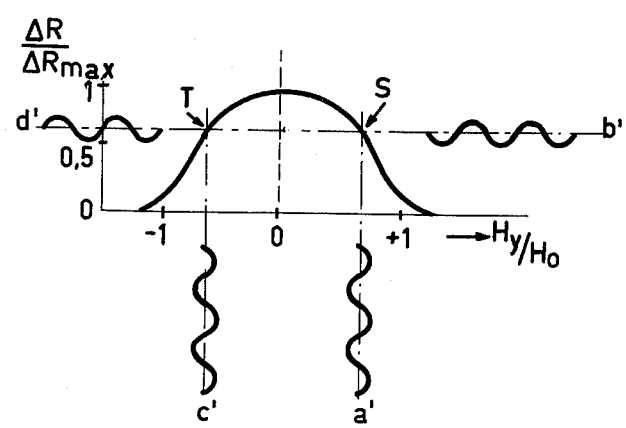
FIG. 5 is a graph showing the variation of the resistance R of a magnetically biased magnetoresistive element as a function of a transversal external magnetic field $H_y$, in which $\Delta R/\Delta R_{max}$ is plotted on the vertical axis and $H_y/H_o$ is plotted on the horizontal axis.

FIG. 5 is a graphic representation of the variation of the resistance R of the magnetically biassed magnetoresistive elements 11 and 21 of FIGS. 3 and 4, respectively, under the influence of an external field $H_y$, in which $\Delta R/\Delta R_{max}$ is plotted on the vertical axis and $H_y/H_o$ is plotted on the horizontal axis. In contrast with the situation shown in FIG. 2 in which there was one adjusting point (P), there are now two adjusting points (S and T). A voltage denoted by b' is associated with a varying $H_y$ field denoted by a' and a voltage denoted by d' is associated with a varying $H_y$ field denoted by c'. With fields a' and c' varying in the same manner, the phases of the voltages b' and d' are different, which presents an extra choice possibility to adjust the correct phase of the negative feedback field.

The construction of the magnetoresistive elements 1, 11 and 21, respectively, will be described in detail with reference to FIGS. 6, 7, 8 and 9.

Figure 6:
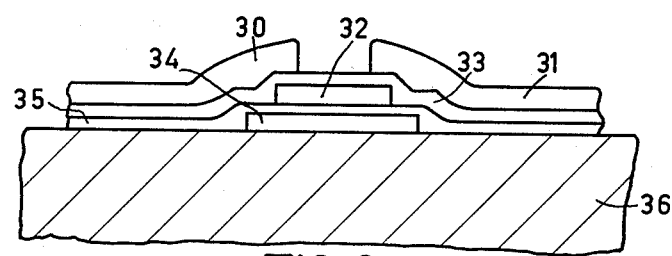
FIG. 6 is a diagrammatic cross-sectional view.

FIG. 6 is a cross-sectional view of a magnetoresistive element 32 provided with magnetic flux conductors 30 and 31 which may be, for example, from a nickel-iron alloy. The flux conductors 30 and 31 are separated from the element 32 by a thin quartz layer 33 and overlap the side edges thereof. They "amplify" as it were a magnetic field to be detected. The element 32 is provided on a current conductor 34, which serves as a negative feedback turn, but is separated therefrom by a quartz layer 35. The current conductor 34 is provided on a substrate 36. All this is shown in the plan view of FIG. 7.

Figure 7:
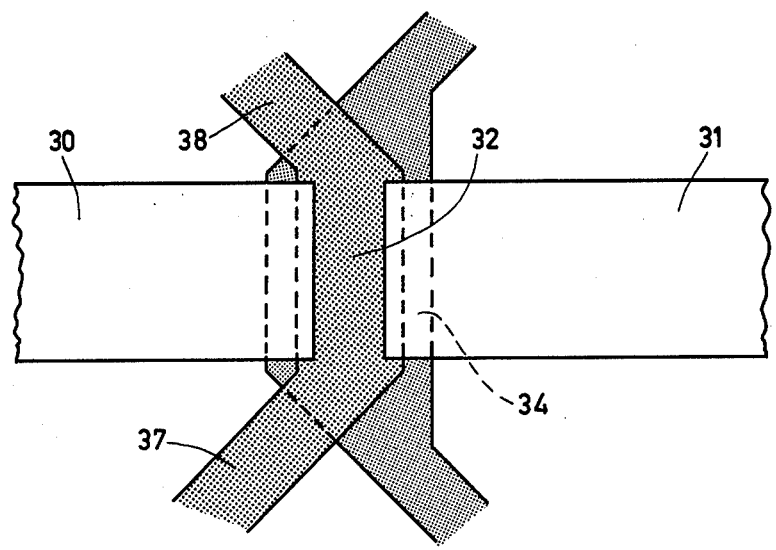
FIG. 7 is a plan view of a magnetoresistive element with negative feedback wire to be used in the reading heads shown in FIGS. 1, 3 and 4.
Figure 8:
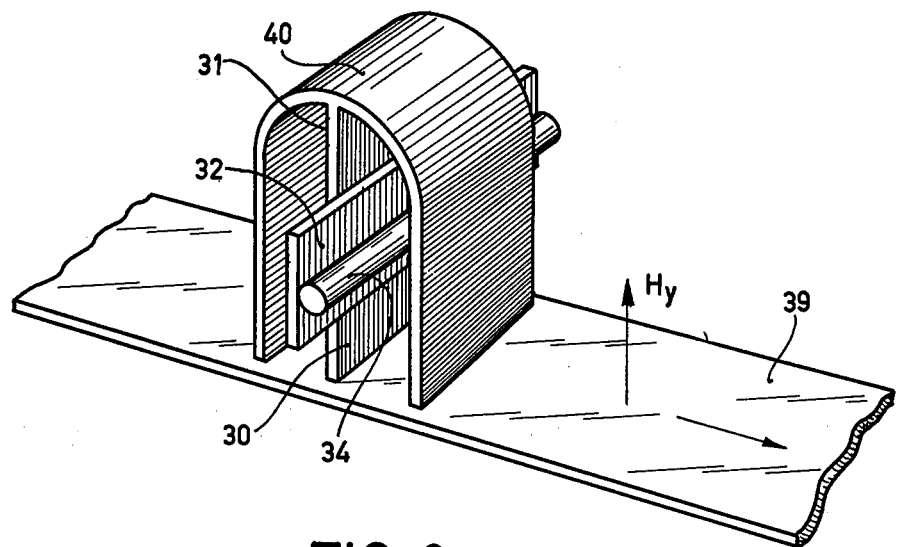
FIGS. 8 and 9 show two different embodiments of a reading head configuration with the magnetoresistive element shown in FIGS. 6 and 7.

FIG. 8 shows diagrammatically the building-in of the construction shown in FIGS. 6 and 7 in a three-limb magnetic screen 40. The quartz layers 33 and 35 are not shown, nor is the substrate 36. In this case the current conductor 34 is a wire. In practice the distance between the limbs of the screen 40 and the magnetoresistive element is smaller and the intermediate spaces are filled with, for example, a layer of quartz.

Figure 9:
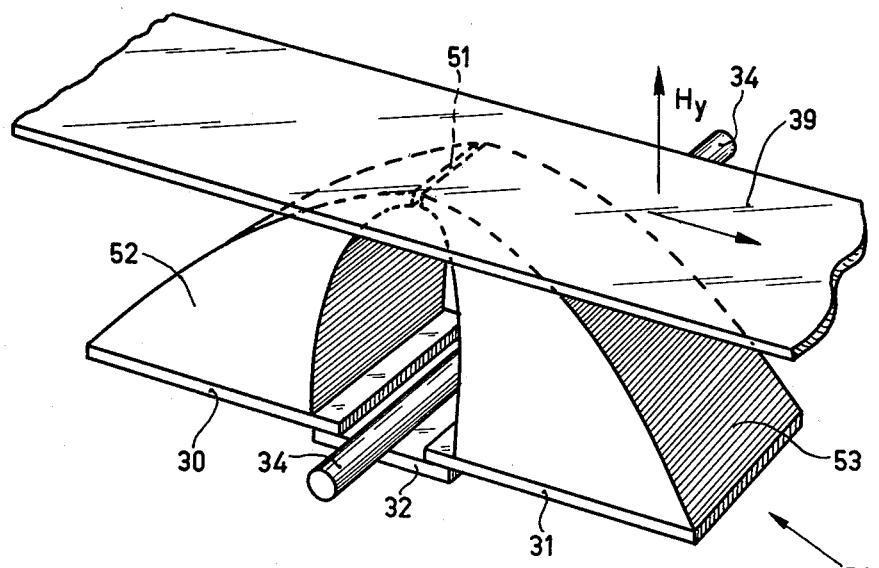

FIG. 9 shows the building-in of a construction comparable to the construction shown in FIGS. 6 and 7 in the rear yoke of a magnetic head 50 which comprises two pole shoes 52, 53 which define a reading gap 51. The quartz layers 33 and 35 and the substrate 36 are not shown. In this case the current conductor 34 is a wire which is present on the side of the flux conductors 30 and 31 of the magnetoresistive element 32.

In a prototype of the magnetic head the element 32 consisted of a thin layer of an Ni-Fe alloy in a thickness of approximately 800 A, a length of 600 microns and a height of 40 microns. Connection contacts 37 and 38 (FIG. 7) were formed by vapor-deposited strips of gold. A number of thin gold strips in a thickness of 0.5 micron and a width of 2 microns were provided on the element 32 at mutual distances of 8 microns at an angle of 45°. Gold having a 5 times lower resistivity than the Ni-Fe used and the thickness of the gold strips being approximately 10 times as large as the thickness of the element 32, the gold strips conduct 50 times better and serve as "equipotential strips" which force the current in the Ni-Fe paths between them to flow at an angle of approximately 45° with the longitudinal direction. When the head is brought in flux coupling with a magnetic field $H_y$ of a magnetic tape 39, the resistance of each of the Ni-Fe strips situated between the equipotential strips will decrease or increase in accordance with the fact whether the direction of magnetisation coincides more or less with the current direction under the influence of the field.

A negative feedback field which is opposite to the field $H_y$ is generated by means of a current wire. When the gold strips are omitted, the element 32 should be magnetically biased for which purpose a magnetic bias field should be generated, preferably also by means of the current wire 34.

EXPERIMENTS

These have been carried out with magnetoresistive elements provided with inclined gold strips and with normal magnetoresistive elements. The following data relate to a normal element. This is maximally driven at 1 Oersted pp (second harm. 1000 Hz −20 dB) When the element is incorporated in the amplifier with negative feedback wire (+1 mA adjusting current) the driving can be increased to 10 Oersted pp and then the most important second harmonic distortion is only −60 dB.

An element is mounted in the rear circuit of a head as shown in FIG. 9 and tape measurements have been carried out. The maximum field at the element without negative feedback then is 0.5 Oersted pp. The negative feedback used (35×) is then amply sufficient.

FIG. 10 shows the distortion which was measured when using a magnetoresistive element without negative feedback and FIG. 11 shows the distortion which was measured when using a magnetoresistive element with negative feedback (21.8×). The distortion in dB is plotted on the vertical axis and the strength of the field which influenced the element (frequency 1000 Hz) is plotted on the horizontal axis. The second harmonics of the reading signal are represented by the open circles the third harmonics by the crosses. The Barkhausen effect is reduced by 20 dB.

It is possible by means of a large external field to move the adjusting point so far that the phase of the voltage across the element flips over so that the negatively fed back circuit starts oscillating. The advantage of the alternating current negative feedback then is that when the external field is removed the circuit becomes stable again. In practice it has been found that the reading head can be screened sufficiently to counteract such shifts of the adjusting point.

In principle the influence of said shifts by external direct fields can be counteracted by using direct current negative feedback. However, attention is invited, for, when in this case, by some course or other, the wrong adjusting point is achieved, the circuit oscillates and will remain oscillating also when the external field is removed. It should therefore be ensured that said adjusting point can never be reached.

In fact this is most successful in the normal MRH (magneto restrictive head) which has also one forbidden region.

FIG. 12 shows a magnetoresistive element 51 which is connected to a circuit which is related to the circuits shown in FIGS. 1, 3 and 4 but which in this case is constructed so that instability by a wrong polarity of the magnetic bias field is prevented.

A bridge circuit having element 61 and $R_3$ is situated at the input of an amplifier 65. For thermal stability, $R_3$ is preferably also a magnetoresistive element on the same substrate. By means of the current $i_4$ it is controlled that the output of the amplifier 65 becomes negative and passes a negative current to a negative feedback wire 63 via $R_5$, transistor $T_1$ and $R_4$. Because $T_1$ can pass negative currents only, adjustment will be possible only in the stable area. A small negative bias current can be adjusted by means of $R_6$.

The alternating voltage negative feedback path is then via $C_1$ and $R_2$ with $R_2=100$ Ω, $C_1=470$ μF. The direct voltage negative feedback path is via $R_5$, $C_2$, $T_1$ and $R_4$ with $R_5 \cdot C_2 = R_2 \cdot C_1$ and $R_5 = 10$ k$\Omega$, $C_2 = 4.7$ $\mu$F, $R_4 = 100$ $\Omega$.

What is claimed is:

1. A magnetic reading head for detecting information representing magnetic fields which comprises:
    an electromagnetic transducer of the magneto-resistive type having at least one operating range which is substantially linear;
    means for producing a varying magnetic field which counteracts the field sensed by said transducer to maintain said transducer in said one operating range;
    said transducer being a substantially flat, magneto-resistive element of metallic ferromagnetic material having an easy axis of magnetization in the plane of said element, said element being provided on two oppositely located ends with contacts for the connection to an associated source providing a measuring current and to an associated reading amplifier; and
    said means for producing comprising a turn of an electrically conductive material which is provided in a negative feedback loop of the reading amplifier, said turn being arranged relative to the magneto-resistive element in such a manner, that, when a current passes through it, it generates a negative feedback field which causes a magnetic flux in the element which is directed oppositely to the magnetic flux caused in said element by a detected magnetic field.

2. A reading head as claimed in claim 7, further including a circuit for causing such a current to flow through said turn so that the negative feedback field exclusively comprises an alternating field component, said alternating field component representing the output signal of the reading amplifier.

3. A reading head as claimed in claim 2, wherein said circuit causes such a current to flow through said element so that the negative feedback field also comprises a direct field component, said direct field component providing the bias field for said element.

4. A reading head as claimed in claim 3, wherein said circuit comprises means for preventing instability due to a wrong polarity of the bias field.

5. A reading head as claimed in claim 1, 2, 3 or 4, wherein said element has a maximum sensitivity for detecting information-representing magnetic fields of a given strength.

6. A reading head as claimed in claim 5 further including a substrate carrying the other parts of said reading head.

* * * * *